United States Patent [19]
Jonason et al.

[11] Patent Number: 5,353,541
[45] Date of Patent: Oct. 11, 1994

[54] COLLAPSIBLE CRAB TRAP WITH A CENTER BAIT FEEDER AND WEIGHTED SIDE DOORS

[76] Inventors: John O. Jonason; Estelle Jonason, both of 186 Grove St., South Amboy, N.J. 08879

[21] Appl. No.: 176,434

[22] Filed: Jan. 3, 1994

[51] Int. Cl.⁵ .............................................. A01K 69/10
[52] U.S. Cl. ........................................ 43/105; 43/100
[58] Field of Search ................. 43/100, 101, 102, 103, 43/104, 105, 106

[56] References Cited

U.S. PATENT DOCUMENTS

| | | | |
|---|---|---|---|
| 1,531,299 | 3/1925 | Merle | 43/105 |
| 1,968,758 | 7/1934 | Gatch | 43/105 |
| 2,584,643 | 2/1952 | Vander Clute | 43/105 |
| 3,867,782 | 2/1975 | Ortiz | 43/105 |
| 4,044,493 | 8/1977 | Fox | 43/105 |
| 4,177,601 | 12/1979 | Morton | 43/103 |
| 4,184,283 | 1/1980 | Wyman | 43/102 |
| 4,434,575 | 3/1984 | Pearson | 43/100 |
| 5,197,224 | 3/1993 | Aulsebrook | 43/100 |

*Primary Examiner*—P. Austin Bradley
*Assistant Examiner*—James Miner
*Attorney, Agent, or Firm*—Ezra Sutton

[57] ABSTRACT

A collapsible crab trap is provided with a centrally-located bait feeder made of wire mesh material. The trap and bait feeder are movable between a collapsed configuration and an assembled configuration. When in a collapsed configuration, it is easy to store or transport. The centrally-located bait feeder apparatus is constructed in such a manner that the crabs cannot remove an entire piece of bait from the bait feeder. Another feature of this crab trap is that the two side panels are weighted along their upper edges to positively open the side panels when on the ocean bed for the catching of crabs. These weighted side panels also provide a stable placement of the crab trap in strong moving currents.

15 Claims, 5 Drawing Sheets

COLLAPSIBLE CRAB TRAP WITH A CENTER BAIT FEEDER AND WEIGHTED SIDE DOORS

BACKGROUND OF THE INVENTION

1. Field of the Invention

This invention is related to a collapsible crab trap and, more particularly, to a crab trap which has a center bait feeder for easy access to supply bait and weighted side panels to insure the immediate opening of those side panels to catch crabs.

2. Description of Prior Art

U.S. Pat. Nos. 1,968,758 and 1,383,992 are examples of the prior art. They have the disadvantage of being a square box-type design, and they are cumbersome to assemble because the top and bottom members are of different size measurements. Another disadvantage of crab traps of this type is that a square box profile does not appear to be as enticing to crabs as a profile which is rectangular in shape.

Still another disadvantage of these crab trap designs is in not having a bait holder or bait feeder cage. Accordingly, the bait must be tied to the mesh bottom panel, and the crabs have a tendency to pull off an entire piece of bait from the trap.

Finally, another disadvantage of crab traps of this type is that they show no stability in their open state when on the ocean bed in strong tidal currents, as they tend to roll around or turn over, thus preventing the crabs from entering the trap.

U.S. Pat. No. 4,044,493 is a more recent example of the prior art. However, this patent has the disadvantage of not having a bait housing or bait feeder cage, whereas the bait is tied to the U-shaped support members or the bottom mesh panel, and the crabs have a tendency to pull off entire pieces of bait from the trap.

Another disadvantage of a crab trap of this type of design is that the side and end panels have a tendency to get stuck in the top member panel when in the closed position when lowering or pulling up the crab trap from the ocean water.

Still another disadvantage of this type of crab trap design is their lack of being stable in strong tidal currents, as they tend to roll around or turn over in those moving currents.

SUMMARY OF THE INVENTION

It is the primary object of the present invention to provide a collapsible crab trap which has a centrally-located bait feeder with an access door for easy baiting of the trap.

It is another object of the present invention to provide a crab trap with weighted side panels to positively insure the immediate opening of those side panels which entices the crabs to enter the trap and feed on the bait in the centrally-located bait feeder.

Another object of this present invention is that the weighted side panels have a greater height dimension than the top of the trap, which insures that the weighted side panels do not get stuck in the crab trap when in its closed state.

Another object of this present invention is that the two weighted side panels in their open state and lying on the ocean bed give stability and placement of the crab trap in the ocean bed, thus preventing the crab trap from moving in strong currents.

Still another object of this present invention is that the two weighted side panels in their open state have a configuration of a slightly inclined ramp, which gives an easy access for the crabs to enter the trap and feed on the bait in the center bait feeder.

Still another object of the present invention is that the collapsible crab trap in its present arrangement is very easy to transport, as it has no loose pieces when in its collapsed state. Also, the trap can be assembled in one manual step from a collapsed state to an open state by simply attaching one spring to the side bait panels and top panel of the bait feeder.

BRIEF DESCRIPTION OF THE DRAWINGS

Further objects, features, and advantages of the present invention will become apparent upon consideration of the detailed description of the presently-preferred embodiment, when taken in conjunction with the accompanying drawings wherein.

DETAILED DESCRIPTION OF THE PREFERRED EMBODIMENT

Figure 1:
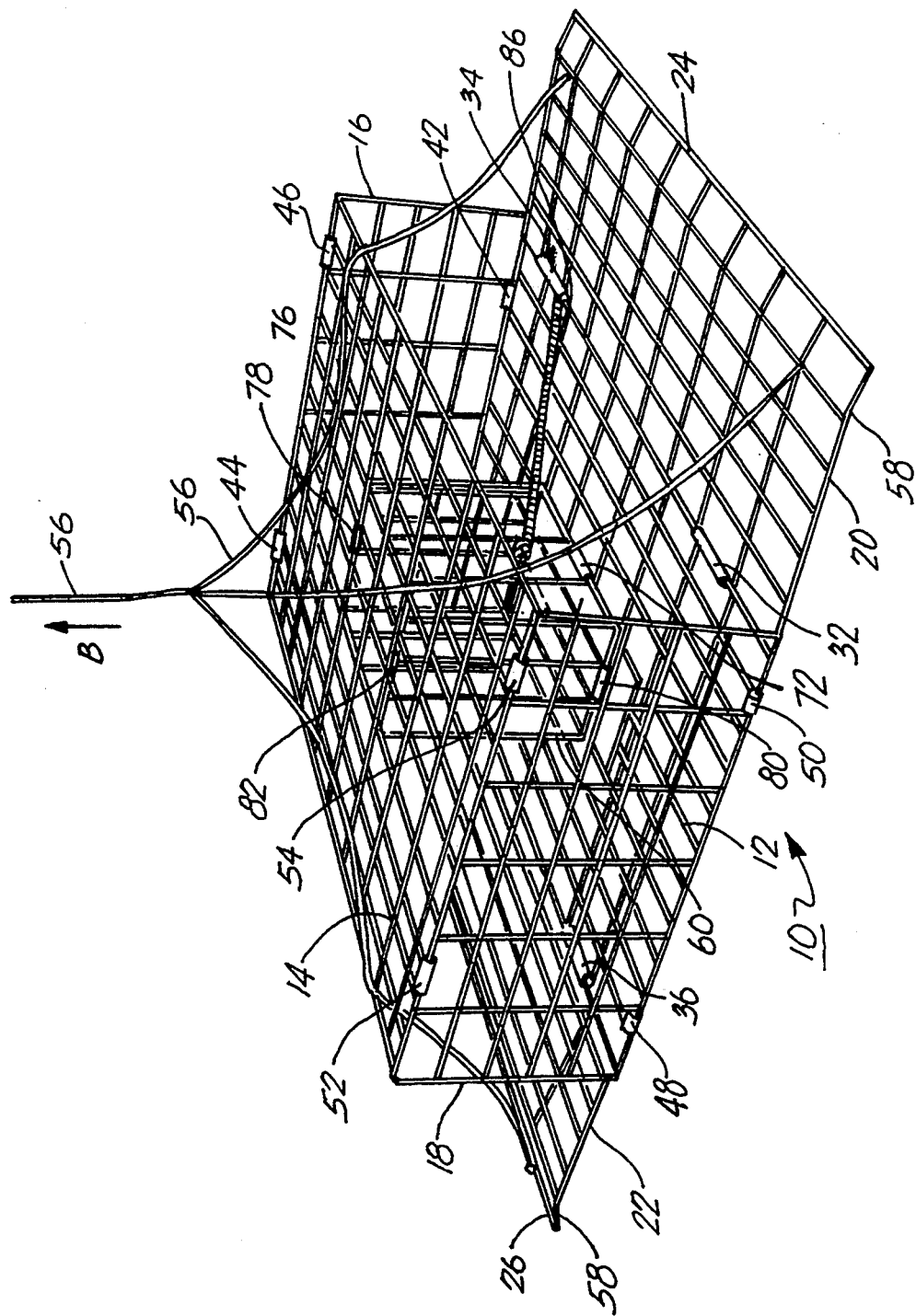
FIG. 1 is a perspective view of the collapsible crap trap of the present invention in an open position and ready to catch crabs.
Figure 2:
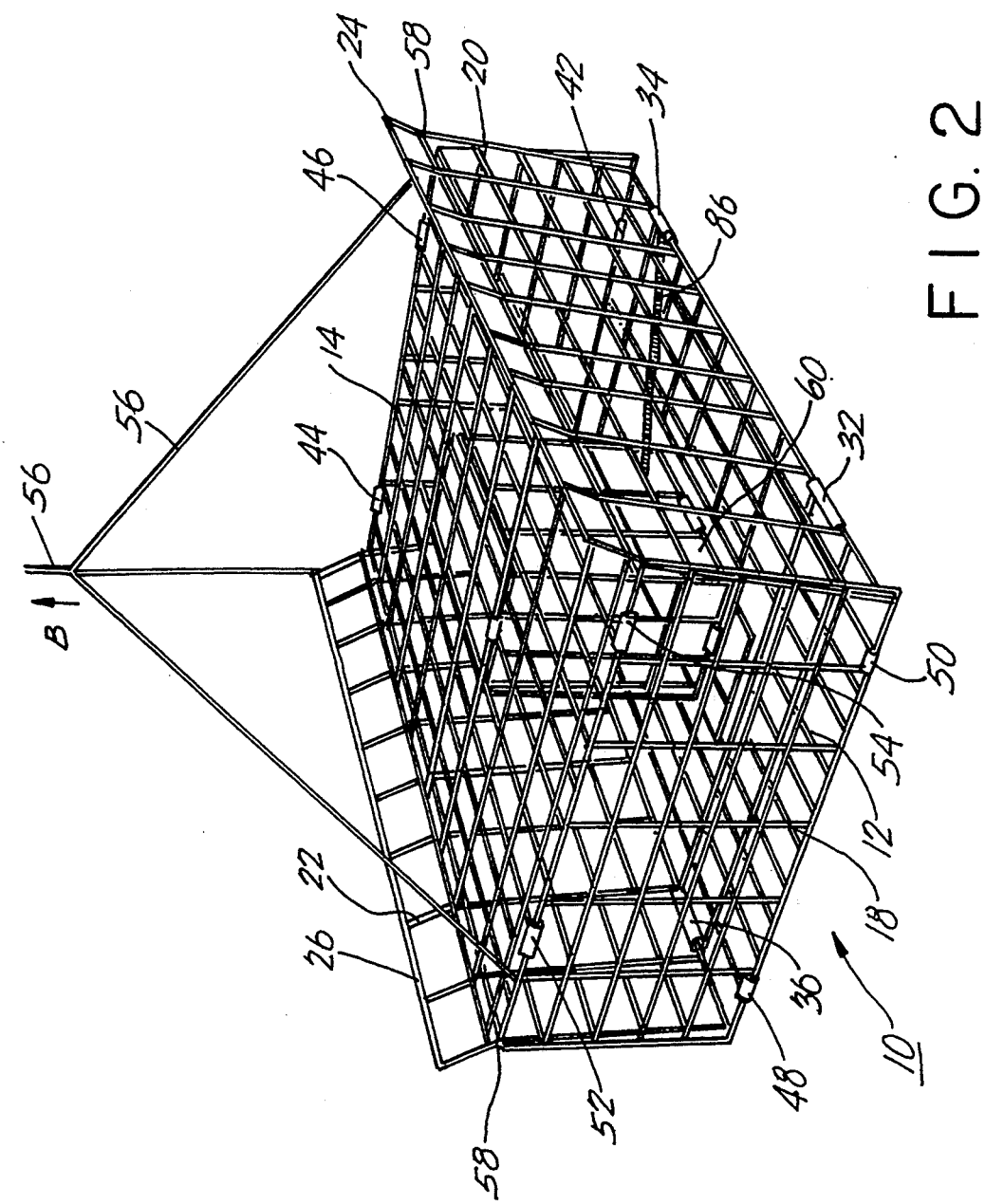
FIG. 2 is a perspective view of the collapsible crab trap of the present invention in a closed position.
Figure 3:
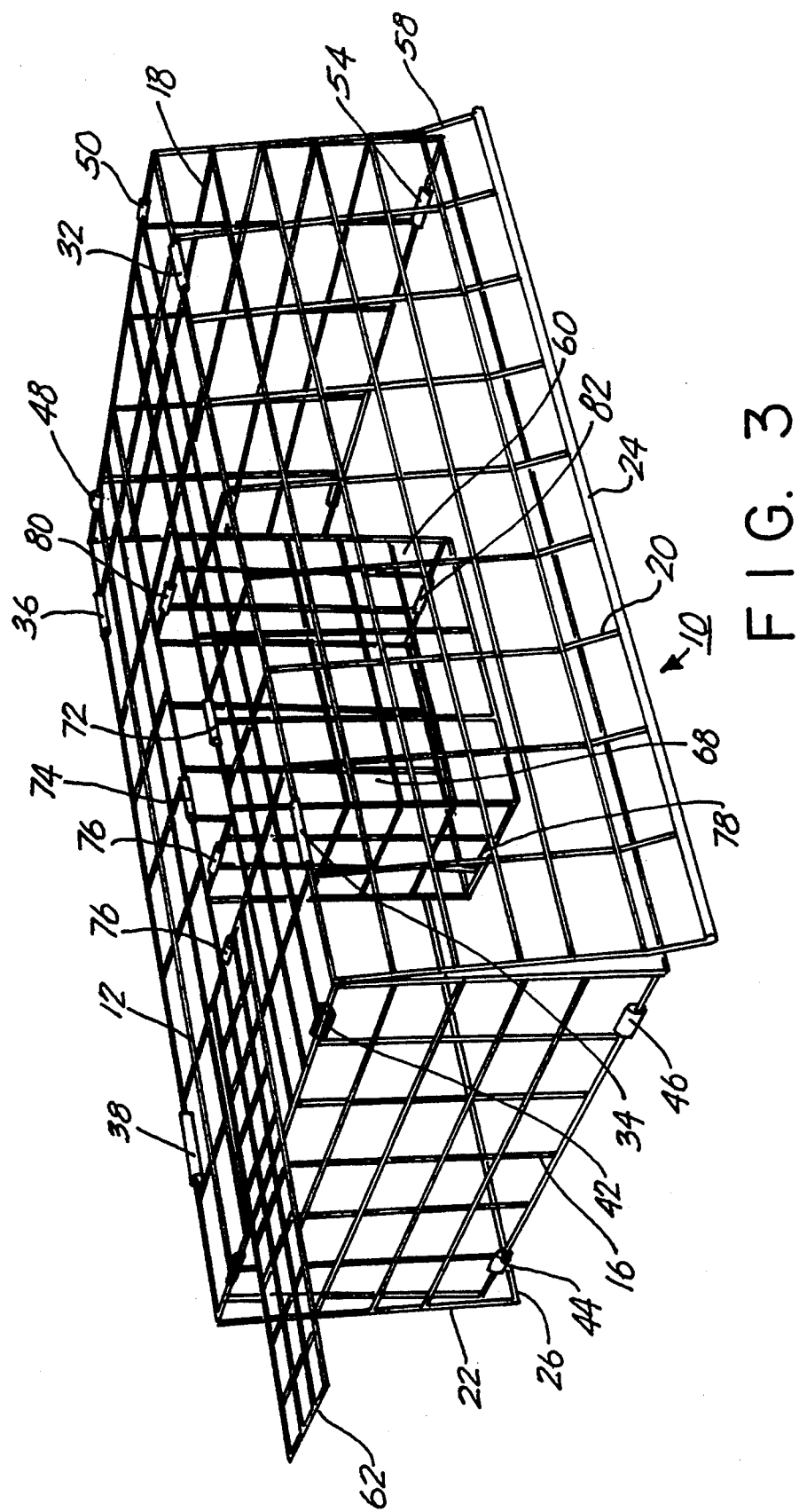
FIG. 3 is a perspective view of the collapsible crab trap of the present invention from a bottom view, with the bait feeder door in the open position and ready to be loaded with bait.

The collapsible crab trap 10 and the centrally-located bait feeder 60 are made of wire mesh material, as shown in the drawings. FIG. 1 shows the crab trap 10 in the open position, and FIG. 2 shows the crab trap 10 in the closed position. FIG. 3 shows the crab trap 10 from a bottom perspective, emphasizing the centrally-located bait feeder 60, with the bait feeder bottom door 62 in the open position. Crab trap 10 is movable between a collapsed configuration, to a partially collapsed position, as shown in FIG. 5, to a fully-assembled position, as shown in FIGS. 1 through 4. The center bait feeder 60 is shown from a bottom view in FIG. 4, with the bait feeder door 62 in a closed position. A latch spring or other suitable closure may be used for securing the bait feeder door 62 in the closed position.

The crab trap 10 is shown in the assembled configuration in FIGS. 1 and 2. The crab trap 10 comprises a bottom panel 12 made of wire mesh material; a top panel 14 made of wire mesh material; two end panels 16 (right side) and 18 (left side) made of wire mesh material movably connecting the top and bottom panels 12 and 14; and two side panels 20 (right side) and 22 (left side) made of wire mesh material, each pivotally connected to opposite side edges of the bottom panel 12.

Side panels 20 and 22 have heavier weighted upper rods 24 and 26, respectively, which are the same length as the side panels. These upper weighted rods 24 and 26 are preferably 9 gauge in thickness and weigh approximately 2 ounces each, while the rest of the trap is made of lighter weight 14 gauge wire mesh. The wire mesh material is galvanized to prevent salt water corrosion and rusting. Because the side panels 24 and 26 are weighted along their upper edges, they positively open when disposed in the water for catching crabs.

FIG. 5 shows tubular hinge clips 32 and 34 pivotally connecting right side panel 20 and bottom panel 12. Tubular hinge clips 36 and 38 pivotally connect left side panel 22 and bottom panel 12. FIG. 5 also shows the tubular hinge clips 40, 42, 44, and 46 movably connecting right end panel 16 to the bottom and top panels along with the tubular hinge clips 48, 50, 52, and 54 movably connecting left end panel 18 to the bottom and top panels 12 and 14.

Figure 4:
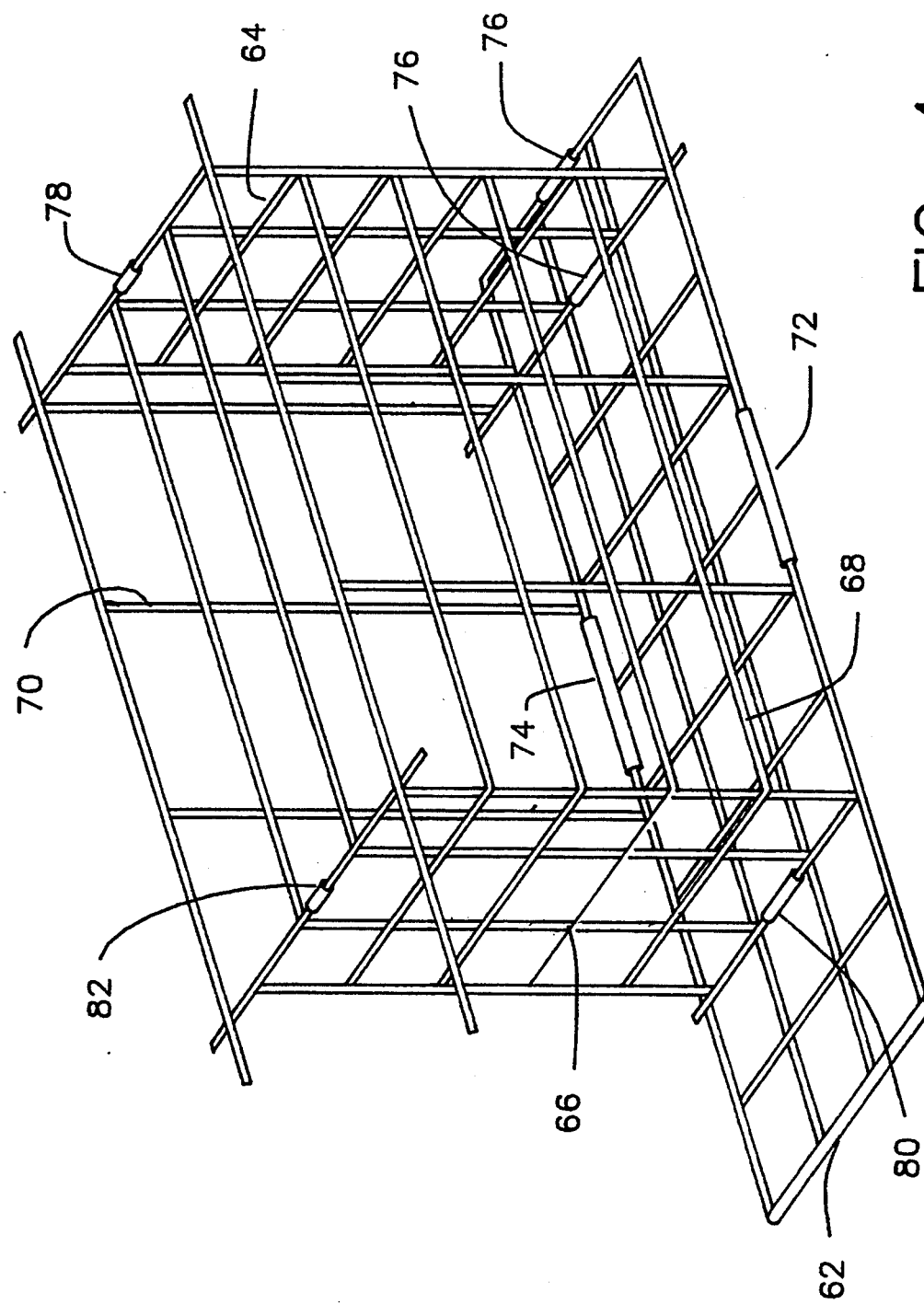
FIG. 4 is a perspective view of the collapsible bait feeder, with the bait feeder door on the bottom.
Figure 5:
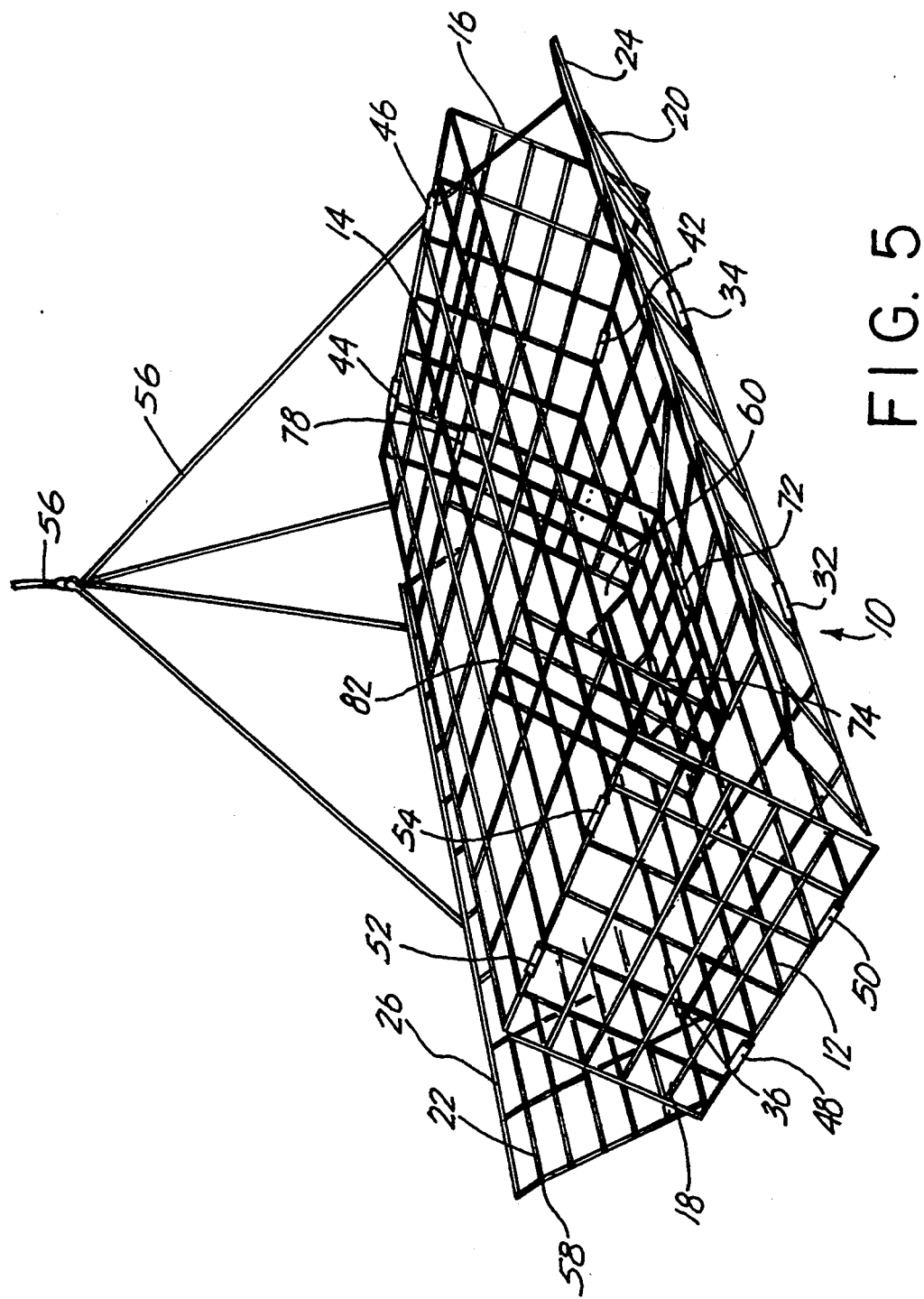
FIG. 5 is a partially-collapsed view of the collapsible crab trap showing the hinging aspect of the top and bottom panels relative to the side and end panels, so that the crab trap may be fully collapsed into a substantially-flat configuration.

When the bait feeder apparatus 60 is in the assembled configuration, as shown in FIGS. 3 and 4, bait feeder apparatus 60 is disposed within the center of crab trap 10. The bait feeder apparatus 60 is made of wire mesh material and has two end panels 64 and 66 movably connected to the bottom and top panels 12 and 14, respectively; also, two side panels 68 and 70 each pivotally connected to the bottom panel member 12; and a bait feeder access door 62, which is pivotally connected to the bottom panel member 12 and may be latched thereto for closure. The bait door 62 is held in a closed position with a latch spring with S hooks or similar closure devices. Preferably, the bait feeder apparatus 60 is assembled and held in an open configuration by the securing of a latch spring with S hooks to the two side bait panels 68 and 70 through the top panel member 14, thus giving the bait feeder 60 a rigid form.

In FIG. 4, the drawing shows tubular hinge clips 72 and 74 that pivotally connect the two side bait feeder panels 68 and 70 to the bottom panel member 12. FIG. 4 also shows the tubular hinge clips 76 and 78 and tubular hinge clips 80 and 82 that pivotally connect the end bait panels 64 and 66 to the bottom and top panels 12 and 14, respectively. It should be noted the tubular hinge clip 80 movably connects the bait feeder door 62 to bottom panel member 12.

ADVANTAGES OF APPARATUS

The advantages in the operation of the crab trap 10 are that with the use of weighted side panels 20 and 22, the weighted crab trap is lowered into the water to the ocean bed, and when contact with the ocean bed is made, the weighted side panels 20 and 22 will positively open. In conjunction with the above is that the weighted side panels 20 and 22 have a greater height dimension than the bottom-to-top height of the rectangular crab trap 10. This insures that the weighted side panels 20 and 22 do not get stuck in the crab trap 10 when it is in its closed state.

Still another advantage of the operation of the crab trap 10 is that the two weighted side panels 20 and 22 in their open state, as shown in FIG. 1, lie on the ocean bed and give stability and firm placement of the crab trap 10 in the ocean bed. This prevents the crab trap from rolling around, turning over, or move in strong ocean currents.

Another advantage of crab trap 10 is that two weighted side panels 20 and 22 in their open state on the ocean floor have the configuration of a slightly inclined ramp, which gives an easy access for the crabs to enter the trap 10 and feed on the bait in the center bait feeder 60. This ramp effect is due to having an outward oblique angle 56, as shown in FIGS. 1 and 2, on the top portion of the weighted side panels 20 and 22.

Another advantage is that when the crab trap 10 is in its collapsed configuration, the end panels 16 and 18, side panels 20 and 22, end bait feeder panels 64 and 66, and side bait feeder panels 68 and 70 lie in a plane substantially parallel to the top and bottom panels 14 and 12, respectively. Conversely, when the crab trap 10 is in its assembled configuration, the end panels 16 and 18, side panels 20 and 22, end bait feeder panels 64 and 66, and side bait feeder panels 68 and 70 are substantially perpendicular to the top and bottom panels 14 and 12, respectively.

OPERATION OF APPARATUS

When taking the crab trap 10 out of its collapsed configuration, the trap 10 can be assembled in one manual step to an open configuration, as shown in FIGS. 1 and 2, by simply attaching spring 86 between the two side panels 68 and 70 through the top panel 14, thus giving the crab trap 10 and bait feeder apparatus 60 their assembled and rigid form.

Bait now can be put into the bait feeder apparatus 60 by opening the bait door 62. The bait door 62 is held in a closed position with another latch spring or other closure device, which is attached to the bottom panel 12.

The crab trap 10 is now ready for operation. The crab trap 10 is lowered into place in the water to the ocean bed by a nylon string 56, as shown in FIGS. 1 and 2. With the release of nylon string 56 to a slack position, the weighted side panels 20 and 22 positively open and rest on the ocean bed. The weighted side panels 20 and 22 embed themselves in the ocean floor, which gives the crab trap 10 a stable and firm placement in strong ocean currents. With the two weighted side panels 20 and 22 lying on the ocean bed, they have a slightly inclined ramp, which gives an easy access for the crabs to enter the trap 10 and feed on the bait in the center bait feeder 60, as shown in FIGS. 1 and 4.

Once a crab(s) enters the trap 10 to eat the bait in the bait feeder 60, the nylon string 56 is then pulled up in the direction of arrow B, which causes the weighted side panels 20 and 22 to pivot about the bottom panel 12 until they are in a closed position, as illustrated in FIG. 2. This action entraps the crabs in the cage. The nylon string 56 is then further pulled up in direction B, which will then pull the trap 10 out of the ocean water.

The crabs are then removed from the crab trap 10 by releasing the tension on the nylon string 56, and the side panels 20 and 22 positively fall open, giving access to the crabs for removal thereof. The bait feeder 60 can either be emptied or reloaded for reuse.

After the crabbing is completed, the crab trap 10 and bait feeder 60 are easily transformed to their collapsed configuration by unlatching spring 86 from the top panel 14. With the crab trap 10 in its collapsed state, it is compact and flat and can be easily transported and stored.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A crab trap and bait feeder made of mesh material and movable between a collapsed configuration and an assembled configuration, comprising:
   a) a bottom member made of mesh material;
   b) a top member made of mesh material;

c) two end panels made of mesh material movably connecting said top and bottom members;
d) two side panels made of mesh material, each pivotally connected to opposite side edges of said bottom member;
e) each of said two side panels having weights thereon to positively open said side panels when disposed in water for catching crabs;
f) a bait feeder made of mesh material and disposed within said crab trap and being movably connected to said top and bottom members;
g) said bait feeder including a plurality of sidewalls for enclosing bait therein;
h) said bait feeder having an access door for loading and unloading bait;
i) strings connected to said crab trap for operating same; and
j) said crab trap and bait feeder being movable between a collapsed configuration, wherein said end panels, side panels, and bait feeder sidewalls lie in a plane substantially parallel to said top and bottom members, and an assembled configuration, wherein said end panels, side panels, and bait feeder sidewalls are substantially perpendicular to said top and bottom members.

2. A crab trap and bait feeder in accordance with claim 1, wherein said side panels exceed the height of said end panels to insure that said side panels freely open when disposed in water.

3. A crab trap and bait feeder in accordance with claim 1, wherein each of said side panels have weights on the upper edge thereof to positively open said side panels.

4. A crab trap and bait feeder in accordance with claim 1, wherein said bait feeder includes four sidewalls movably connected relative to said top and bottom members.

5. A crab trap and bait feeder in accordance with claim 1, wherein the top member of said crab trap forms the top closure of said bait feeder.

6. A crab trap and bait feeder in accordance with claim 1, wherein the bottom member of said crab trap has an opening formed therein for access to said bait feeder and wherein said access door is connected to said bottom member for opening and closing said opening in said bottom member.

7. A crab trap and bait feeder in accordance with claim 1, wherein said bottom member has a dimension of 11 inches by 18 inches, and said top member has a dimension of 12 inches by 18 inches.

8. A crab trap and bait feeder in accordance with claim 1, wherein said side panels each have a dimension of 6 inches by 18 inches.

9. A crab trap and bait feeder in accordance with claim 1, wherein said end panels each have a dimension of 5 inches by 12 inches.

10. A crab trap and bait feeder in accordance with claim 4, wherein the sidewalls of said bait feeder each have a height of 5 inches, and wherein an opening for said access door has a dimension of 3 inches by 6 inches.

11. A crab trap and bait feeder in accordance with claim 1, wherein the mesh material has openings of 1 inch by 2 inches.

12. A crab trap and bait feeder in accordance with claim 1, wherein said two side panels are pivotally connected to said bottom member by hinges.

13. A crab trap and bait feeder in accordance with claim 1, wherein said bottom member is smaller than said top member.

14. A crab trap and bait feeder in accordance with claim 1, wherein the mesh material has openings of 1 inch by 1 inch.

15. A crab trap and bait feeder in accordance with claim 1, wherein said access door is coextensive with one of said top and bottom members.

* * * * *